United States Patent Office 3,658,759
Patented Apr. 25, 1972

3,658,759
FLUORINATED RESOLE
Stuart B. Eglin, Atlanta, and Edgar W. Eisenbraun, Dunwoody, Ga., assignors to Lockheed Aircraft Corporation, Burbank, Calif.
No Drawing. Filed July 22, 1970, Ser. No. 57,838
Int. Cl. C08g 5/08
U.S. Cl. 260—53 H         14 Claims

ABSTRACT OF THE DISCLOSURE

Unique and highly desirable properties are exhibited by a phenol-formaldehyde condensation product when the product contains a trifluoromethyl group in a position meta to the hydroxyl group in each phenyl ring in the product. Among the desirable properties are flame retardance, improved weatherability, resistance to hydrolysis by acids or alkalis, and resistance to thermal degradation. The condensation product is prepared in a base catalyzed reaction by condensing formaldehyde or a formaldehyde-yielding material with a phenolic compound containing a trifluoromethyl group in a position meta to the hydroxyl group on the phenyl ring. The cured condensation product is useful as a matrix for reinforcing fibers in the molding of structural members.

---

This invention relates to the condensation products of formaldehyde and a phenolic derivative and to the process for preparing these products. More particularly the present invention concerns the condensation products prepared, under base catalyzed reaction conditions, from formaldehyde and a phenolic compound containing a trifluoromethyl group in a position meta to the hydroxyl group on the phenyl ring.

Resinous phenol-aldehyde condensation products have been known for many years. These phenolic resins usually employ phenol and formaldehyde as starting materials and consist principally of two types: thermosetting and thermoplastic resins. If the resins are prepared using an excess of formaldehyde in the presence of an alkaline catalyst, they resemble the phenol alcohols and have methylol side or end groups. Such resins are often referred to as resoles. They are termed "One-stage" resins and are of the thermosetting type in that the application of heat results in their forming resites which are infusible three-dimensional polymers.

In order to prepare a resole type condensation product, the phenolic reactant must demonstrate stability in an aqueous base solution so that a base-catalyzed reaction with formaldehyde may be effected. Upon reviewing the literature, it is found that ortho-trifluoromethylphenol and para-trifluoromethylphenol are unstable in basic solutions and are, therefore, unsuitable for use as a reactant in the present process. This would suggest that meta-trifluoromethylphenol would also be unstable in basic solutions and unsuitable for use as a reactant. It is also found that formaldehyde reacts with a phenolic compound at the two positions adjacent, or ortho, and at the one position opposite, or para, to the hydroxyl group of the phenolic compound. With the meta isomer of trifluoromethyl phenol, all three positions are available; in the ortho and para isomers only two positions are available, as indicated:

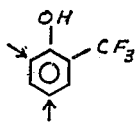

Ortho-trifluoromethylphenol
Two positions available ortho and para

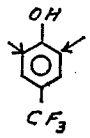

Para-trifluoromethylphenol
Two positions available ortho

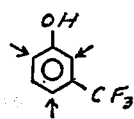

Meta-trifluoromethylphenol
Three positions available ortho and para

It is also apparent from studying the structures of the ortho and para isomer that only linear condensation products would be obtained from these two isomers rather than the more desirable three-dimensional products. In addition, the reaction rates for the ortho and para isomers are slower than for the meta isomers since one of the possible reaction sites in the ortho and para isomers is blocked.

It is also known that the trifluoromethyl group has a marked electron withdrawing influence on the phenyl ring. Consequently it was feared initially that the presence of the trifluoromethyl group might deactivate the phenolic compound and prevent any trifluoromethylphenol from undergoing chemical condensations with formaldehyde. Several preliminary experiments were performed in an attempt to condense meta-trifluoromethylphenol with formaldehyde under normal reaction conditions for phenol-formaldehyde condensations. These attempts were generally unsuccessful. Subsequently, reactions were run at higher temperatures or with a very large concentration of alkaline catalyst and a desired condensation product was obtained.

It is, therefore, an object of the present invention to provide a novel resole type condensation product, which is prepared by the reaction of formaldehyde and a phenolic compound having a trifluoromethyl group in a position meta to the hydroxyl group on the phenyl ring. This object as well as others will become apparent from a review of the following detailed description of embodiments of the invention.

According to the present invention a novel phenol-formaldehyde condensation product is obtained by reacting formaldehyde or a formaldehyde-yielding material with a phenolic compound containing a trifluoromethyl group in a position meta to the hydroxyl group on the phenyl ring, to yield a trifluoromethylphenol monomer intermediate which contains methylol groups and which condenses to form the condensation product of the present invention. When the trifluoromethylphenolmethylol monomer contains three methylol groups it may condense with additional phenol or the other two trifluoromethylphenolmethylol intermediates of this invention. When the trifluoromethylphenolmethylol monomer contains either one or two methylol groups it may condense with additional phenolformaldehyde and all three trifluoromethylphenolmethylol intermediates of this invention. The reaction of the methylolated trifluoromethylphenols, as heating is continued, leads to two possibilities: (a) formation of the methylene ether, and (b) independent subsequent formation of the diaryl methane. As heating is continued these monomers and dimers will continue to react, forming larger and larger molecules. Finally, the whole structure will gel. The above reaction gives rise to many thousands of isomers since each of the three reactive sides of the methyl-trifluoromethyl ring is unique, and in practice there will be always mono-, di-, and tri-methyltrifluoromethylol phenols present. According to the present invention, the resole will be made up of a mixture of intermediates described by a generalized equation with associated formulas as shown below:

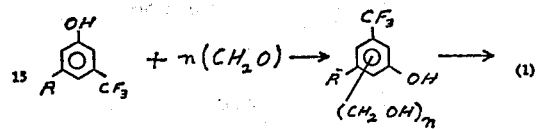

trifluoromethylphenolmethylol where R is hydrogen, hydroxyl, or trifluoromethyl; and $n$ is 1, 2, or 3. The penetrating bond linkage is intended to include bonding of the methylol group at any of the positions ortho and para to the hydroxyl group. It is intended through the use of a designated R group at one meta position to make it clear that the methylol group does not attach at this position on the ring.

The intermediates of Equation 1 condense to yield a mixture of compounds represented by the following formula:

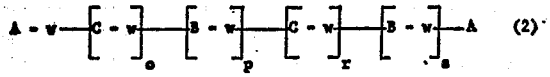

where A is

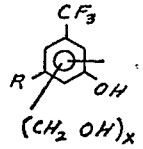

B is

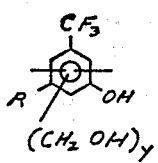

C is either

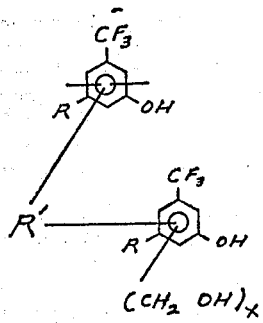

or

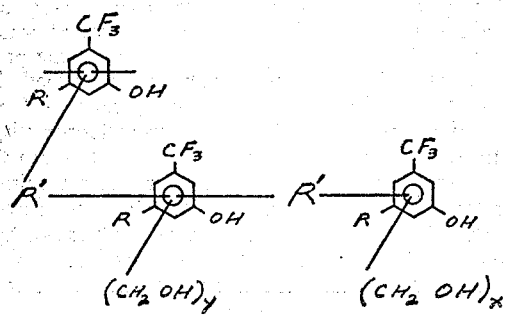

$w$ is —CH$_2$— or —CH$_2$—O—CH$_2$—,
R is —H, —CF$_3$, or —OH,
R' is —CH$_2$— or —CH$_2$—O—CH$_2$—,
$o, p, r,$ and $s$ each is an integer from 0 to 6,
each $x$ is 0, 1, or 2, and
each $y$ is 0 or 1 with at least one of $x$ and $y$ being at least 1.

A specific equation for the present invention is as follows:

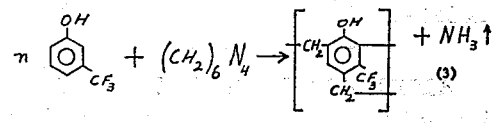

Meta-trifluoromethyl phenol
Hexamethylenetetramine

Since hexamethylenetetramine is a source of formaldehyde, this reaction is an example of a meta-trifluoromethylphenolformaldehyde condensation under one-catalytic and non-aqueous conditions. Formalin and other similar materials may also be used as a source of formaldehyde in this reaction.

An additional specific equation for the present invention is as follows:

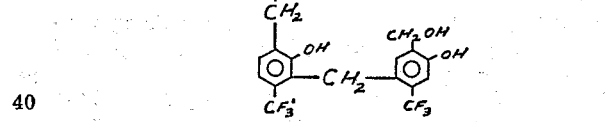

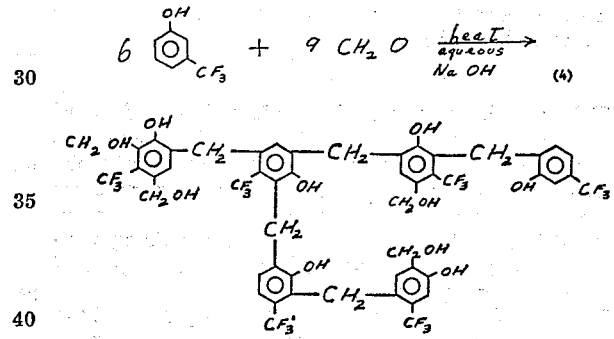

The number of repeating polymer units is shown as six, the products may contain usually from five to ten repeating units. This fluorinated resole condensation product is fusible and is soluble in alcohols and aqueous alkalis. It is capable of being cured to an infusible, insoluble resin by heating.

Suitable phenolic compound reactants include metahydroxybenzotrifluororide, also known as metatrifluoromethylphenol:

a dihydroxytrifluoromethylbenze such as 3,5 - dihydroxybenzotrifluoride, also known as 3,5 - dihydroxytrifluoromethylbenzene

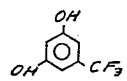

and a ditrifluoromethylphenol such as 3,5 - di(trifluoromethyl)phenol:

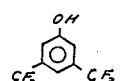

It should be understood that when using metatrifluoromethylphenol as a reactant in commercial grade quantities, there could be a certain amount of the ortho and para isomer's present. These isomers should present no difficulties and should not contaminate the reaction product because they are generally unstable under the reaction conditions, forming water soluble, easily removable compounds.

The meta-trifluoromethylphenol reactant is prepared by nitrating benzotrifluoride (trifluoromethylbenzene) directly with nitric acid to give 3-nitrobenzotrifluoride (m-nitrobenzotrifluoride) which is in turn reduced to 3-amino benzotrifluoride (3 - aminotrifluoromethylbenzene) by ammonium sulfide in alcohol solution. The 3 - aminobenzotrifluoride is then diazotized with sodium nitrite and hydrochloric acid. The resulting diazonium compound is then hydrolyzed in an ice-water mixture to yield the desired metatrifluoromethylphenol.

3,5 - dihydroxybenzotrifluoride is prepared by the following route:

(a) Benzotrifluoride is nitrated with concentrated nitric acid to 3 - nitrobenzotrifluoride and the resulting product is further nitrated to 3,5 - dinitrobenzotrifluoride in a mixture of fuming nitric and fuming sulfuric acid (30% Oleum).

(b) 3,5-dinitrobenzotrifluoride is reduced to 3-amino-5-nitrozenzotrifluoride with ammonium sulfide in alcohol solution. The resulting product is diazotized in sodium nitrite and dilute sulfuric acid and the resulting diazonium compound hydrolyzed with aqueous copper sulfate to yield 3-hydroxy-5-nitrobenzotrifluoride.

(c) The above product is reduced to 3-hydroxy-5-aminobenzotrifluoride with sodium sulfide in alcohol solution. The amino compound is then diazotized as before and the resulting diazonium compound hydrolyzed in aqueous copper sulfate to yield the final product, 3,5-dihydroxybenzotrifluoride. Additional information concerning this material and methods for its preparation may be obtained from the following references:

(1) Whalley, W. B., J. Chem. Soc. (London) 3016, 1949
(2) Finger and Reed, J. Am. Chem. Soc., 66, 1972, 1944.

3,5-di (trifluoromethyl) phenol is prepared by the following route:

(a) Meta-trifluoromethylbenzotrifluoride is nitrated directly with a mixture of concentrated nitric and sulfuric acids to yield 3,5-bis-(trifluoromethyl) nitrobenzene.

(b) That product is then reduced with ammonium sulfide in an alcohol solution to yield 1-amino-3,5-dinitrifluoromethylbenzene.

(c) That product is then diazotized with aqueous sodium nitrite and hydrochloric acid and the resulting diazonium compound is hydrolyzed to yield the final product 3,5-di (trifluoromethyl) phenol. The reactivity of these phenols toward formaldehyde increases in the following order: 3,5-di (trifluoromethyl) phenol, meta-trifluoromethylphenol, and 3,5-dihydroxybenzotrifluoride.

When preparing the intermediate, it has been found that a temperature of 75° C. to 90° C. with atmospheric pressure may be employed when using a preferred molar ratio of dissolved catalyst to phenol of 0.95 to 1.05 moles. Any large excess of catalyst would use up formaldehyde in the Cannizzarro reaction, resulting in neutralization of the excess base. It should be understood that this preparation must be carried out in dilute alkaline solution in water in order to favor the preparation of monomer as opposed to higher condensation products. A ratio of 3 to 6 moles of formaldehyde per mole of phenol has been found to be suitable.

In the reaction which yields the present resole condensation product, the folowing conditions have been found to be suitable:

OPEN SYSTEM

| Temperature, °C. | Pressure | Reaction time |
|---|---|---|
| 90 | Atmospheric | 72 hours. |
| 95 | do | 10 to 12 hours. |

CLOSED SYSTEM [1]

| | | |
|---|---|---|
| 100 | Autogenous | 360 minutes. |
| 110 | do | 180 minutes. |
| 120 | do | 90 minutes. |
| 130 | do | 45 minutes. |

[1] High pressure reactor with a two-liter capacity.

In an open system the preferred reaction temperature is approximately 95° C., and in a closed system the preferred reaction temperature is between about 110° C. and 120° C. By use of the word "Autogenous" we mean that pressure produced by the reaction in a closed system without external influence. Typically this pressure is found to be significantly above atmospheric pressure.

A ratio of reactants for phenolic compound to formaldehyde or formaldehyde-yielding material of approximately 1.2 to 4.0 moles of formaldehyde per mole of phenolic compound yields suitable results. Four moles is an excess which will not adversely affect reaction. Preferably the reactant ratio is 1.4 to 1.8 moles of formaldehyde to one mole of phenolic compound. These reaction ratios are also applicable when employing a blend of reactants such as a blend of meta-trifluoromethylphenol with either or both of 3,5-di (trifluoromethyl) benzene and 3,5-dihydroxybenzotrifluoride.

It has been found that catalysts of the reaction which yields the resole condensation product of the present invention is advantageous and preferred. In order to produce a resole, organic and inorganic basic catalysts should be employed rather than acidic catalysts. Suitable catalysts include tertiary amines such as triethylamine, quaternary ammonium hydroxides, alkali metal hydroxides including lithium, sodium and potassium hydroxide, and alkaline earth metal hydroxides including calcium, strontium, and barium hydroxide. Preferably, the alkaline earth metal hydroxides are employed in the preparation of the present resole products since these catalysts confer special advantages in that a hard and tough composition is obtained. Barium hydroxide octahydrate is particularly preferred as the catalyst in the reaction.

Catalyst concentration in the present reaction ranging from 0.02 to 0.20 mole of the preferred catalyst per mole of phenol have been found to be effective. A preferred catalyst concentration is about 0.03 to about 0.07 mole of catalyst per mole of phenol. The relationship of catalyst concentration to reaction time is apparently not simple, but in base catalyzed phenol/formaldehyde condensations, such as the present reaction, catalyst concentration affects reaction rate because of its effect on pH, and pH in turn begins to affect reaction rates strongly near neutrality. In the present catalyst ranges, the reaction rate does increase where catalyst concentration is increased, but not linearly, and not sharply.

After obtaining the resole condensation product of the present invention it may be configured into various shapes and cured to produce a cross-linked composition of tough and hard characteristics. The bulk resole condensation resin containing no filler or reinforcement materials is placed in a mold and advanced or staged by heating 1 to 2 hours at 240° F.–250° F. under low pressure (20–25 p.s.i.). Curing is then continued under 50 to 100 p.s.i. pressure at 300° F. for three hours. This curing procedure yields a molded part of cross-linked material having good physical properties such as flame retardance and high heat deflection temperature. If an optimum heat deflection character is desired, the resin may be post-cured at 400° F. to 450° F. for an additional hour. The range of cure temperatures has been found to be from about 250° F. to about 400° F. with corresponding cure cycles ranging from about five hours to one hour or less depending on the selected cure temperature.

When curing a resin containing reinforcing fillers or fibers such as glass fibers, graphite fibers, or the like, the advancing or staging of the reinforced resin is carried out at a temperature of 200° F.–250° F. and the cure at 50 p.s.i. or higher at a temperature of 220° F.–400° F.

Reinforced resins including graphite fibers and using barium hydroxide as the alkaline earth metal condensation catalyst and subsequent curing additive demonstrate interlaminar shear strengths equal to those of similar composites derived from commercial epoxy and epoxy novolak resins and have further and distinct advantages of nonflammability, hydrocarbon fuel resistance and water repellency.

It has been found that the storage stability of the resoles of the present invention is unexpectedly superior to conventional resoles. The present resoles may be stored on a shelf for periods of time without marked loss of solubility or fusibility. In addition, it has been found that the heat distortion temperature of the resole prepared from meta-trifluoromethylphenol and formaldehyde, cured and post-cured as indicated previously, is 455° F.–460° F. using ASTM D 648–56. The resole condensation products also exhibit the particularly unique property that cured thin films of the resin do not support combustion. Such a test is a very rigorous indicator of flammability, as most polymers will burn as thin films unless flame retardant materials are added. Furthermore, it has been found that a meta-trifluoromethylphenol-formaldehyde resin when reinforced by Modmor Type II Graphite fibers (Morgonite Research and Development, Ltd.) has up to 11,000 p.s.i. short beam shear strength after curing at 350° F. and post-curing at 460° F. Additional tests for this material reveal that its flexural strength and modulus are comparable to the better epoxy resins. The properties and characteristics of graphite fibers generally are discussed in Reinforced Plastics & Composite World, May/June 1968, pp. 9–13.

As an additional point, it has been found that a resole-type mixed condensation product with increased fluorine content may be prepared by reacting meta-trifluoromethylphenol and 3,5 di(trifluoromethyl)phenol in a part by weight ratio of 3:11 with formaldehyde as disclosed above. The mixed condensation product obtained has interesting and improved properties over conventional resoles. In addition, mixtures of a major amount of meta-trifluoromethylphenol and a minor amount of an additional phenolic material such as phenol or meta-cresol may be reacted with formaldehyde.

A more complete understanding of the present invention will be obtained from a review of the following illustrative examples:

EXAMPLE I

A resole is prepared from meta-trifluoromethylphenol, formaldehyde and barium hydroxide catalyst by adding the materials, in a mole ratio of 1/1.8/0.067, to a 300 ml. closed round bottom flask which is positioned in a steam jacket. The reactants are charged in the following amounts and order: paraformaldehyde, 28.4 grams; distilled water, 48.0 grams; barium hydroxide octahydrate, 10.5 grams; meta-trifluoromethylphenol, 81.8 grams. The reaction mixture is stirred and warmed to 100° C. and held at that temperature until the reaction is completed as determined by the moment when a 29 gram magnetic stirrer in the mixture is not able to rotate any longer. The reaction is run for 6 hours and 30 minutes. After completion of the reaction the resole condensation product is poured hot into a 600 ml. glass beaker, stirred and supernatant water is poured off. The product is then shaped as desired and cooled. The yield is a yellow solid weighing 120. grams.

EXAMPLE II

The procedure of Example I is repeated except that 22.3 grams of paraformaldehyde is charged and the reaction is run for 7 hours and 15 minutes. The mole ratio of materials is thus adjusted to 1.0/1.4/0.067. The product weighed 105 grams.

EXAMPLE III

The procedure of Example I is repeated except that 64.8 grams meta-trifluoromethylphenol (0.40 mole), 34.4 grams of 36.2% formaldehyde (0.415 mole), 6.3 grams of barium hydroxide octahydrate (0.02 mole), and 4.5 grams of distilled water are charged. The mole ratio of materials is thus adjusted to 1/1.04/0.05. The reaction is run for 16½ hours and a brown viscous mass weighing 64 grams is obtained.

EXAMPLE IV

The procedure of Example I is repeated except that 76 grams of meta-trifluoromethylphenol (0.47 mole), 62 grams of 36.2% formaldehyde (0.747 mole), 10 grams of barium hydroxide octahydrate (0.032 mole), and 10 ml. of distilled water are charged. The mole ratio of materials is thus adjusted to 1/1.6/0.067. The reaction is run for 10 hours and 50 minutes and a yellow solid weighing 112 grams is obtained. The yellow solid is soluble in acetone and methanol.

EXAMPLE V

The procedure of Example IV is repeated except that 8.5 grams of strontium hydroxide (0.032 mole) is charged as catalyst rather than barium hydroxide. The mole ratio of materials remains the same. The reaction is run for 11 hours and 15 minutes and a deep yellow material weighing 130 grams is obtained. The melting point of the obtained resin is approximately 52° C.

EXAMPLE VI

The procedure of Example IV is repeated except that 2.4 grams of calcium hydroxide (0.032 mole) is charged as catalyst rather than barium hydroxide. The reaction is run for 15 hours and 15 minutes and a highly viscous yellow material weighing 97 grams is obtained.

EXAMPLE VII

The procedure of Example IV is repeated except that 0.10 mole of magnesium hydroxide is charged as catalyst rather than barium hydroxide. The remaining materials are charged so that the mole ratio of materials is 1/1.6/0.10. The reaction was run for 88 hours and a solid product was obtained.

EXAMPLE VIII

The procedure of Example I is repeated except that 64.8 grams of meta-trifluoromethylphenol (0.4 mole), 20.0 grams of paraformaldehyde (0.63 mole), 25.2 grams of barium hydroxide octahydrate (0.08 mole), and 45 grams of distilled water are charged. This charge is in a mole ratio of 1/1.6/0.2. The initial reaction produces an exothermic heat surge and the flask has to be cooled to maintain a temperature of 100° C. The reaction is run for 6 hours and 25 minutes and a solid resin weighing 111.4 grams is obtained. The resin was purified by being dissolved in 33 grams of methanol and discarding the small amount of precipitate formed. After removal of the methanol by vacuum stripping, analysis of the resin to determine barium content disclosed 11.8% sulfated ash equivalent to 15.9% barium hydroxide and corresponding to 72% of the total amount of barium used. Analysis of the product, a hard yellow solid, by gel permeation chromatography showed that the molecular size distribution of about 90% of the material ranged from 95 to 18 angstrom units, corresponding to 15 to 2 aromatic units in a straight chain.

EXAMPLE IX

A resole is prepared under autogenous pressure by charging 648 grams of meta-trifluoromethylphenol (4 moles), 202 grams of paraformaldehyde (6.4 moles), 432 grams of distilled water, and 85 grams of barium hydroxide octahydrate (0.27 mole) to a cold Parr 4500 Pressure Reactor. The mole ratio for charged materials, excluding water, is 1/1.6/0.067. After charging the materials, the reactor is closed and the heat of the reactor is brought up to 95° C. during 15 minutes. The temperature is then allowed to rise slowly to 136° C., and the reaction is run for a total time of 82 minutes. The maximum pressure achieved is 40 p.s.i. A highly viscous amber colored resin is obtained weighing 912.0 grams.

EXAMPLES X TO XV

A resole is prepared according to Example I from meta-trifluoromethylphenol, paraformaldehyde, and a sodium hydroxide octahydrate catalyst solution employing the following reaction conditions and obtaining the following yields of product:

| Example | Mole ratio of charged materials | Reaction time, hours | Reaction temp., °C | Yield in grams |
|---|---|---|---|---|
| 10 | 1.0/1.5/0.085 | 19 / 6 | 65 / 90–100 | 6.5 |
| 11 | 1.0/1.5/0.08 | 5½ | 93–97 | 54.0 |
| 12 | 1.0/1.6/0.66 | 24 / 4 | 60–80 / 85–95 | 36.7 |
| 13 | 1.0/1.6/0.085 | 5 | 100 | 36.0 |
| 14 | 1.0/1.5/0.8 | 18 / 7 | 50–60 / 90–100 | 70 |
| 15 | 1.0/1.7/0.7 | 24 / 20 | 60–70 / 90–100 | 131.0 |

EXAMPLE XVI

A resole condensation product is prepared from meta-trifluoromethylphenol and hexamethylenetetramine by reacting the two under anhydrous conditions in boiling xylene under reflux temperature. The charge is 66.5 grams of meta-trifluoromethylphenol (0.41 mole), 9.8 grams of hexamethylenetetramine (0.066 mole), and 80 ml. of xylene as a solvent. The mole ratio of reactants is 6.2/1, for phenol to tetramine. The reaction is run for approximately 54 hours. After cooling, the reaction product, a high viscosity liquid is precipitated by adding petroleum ether. A coarse yellow powder product weighing 68.0 grams is obtained after washing with ether.

EXAMPLE XVII

A resole copolymer is produced by initially condensing 46.0 grams of 3,5-di (trifluoromethyl) phenol (0.2 mole), with 9.6 grams of paraformaldehyde (0.3 mole) in the presence of 25.2 grams of barium hydroxide octahydrate (0.08 mole) and 40 grams of distilled water. The reaction is run for 23½ hours with stirring in a steam jacketed 200 ml. round bottom flask. The reaction product, a high viscosity liquid weighing 49.5 grams, is charged into a second steam jacketed flask together with 16.5 grams of metatrifluoromethylphenol (0.1 mole), 10 grams of paraformaldehyde (0.3 mole), 25.2 grams of barium hydroxide (0.08 mole), and 10 grams of distilled water. The reaction is run for 15½ hours and 64.8 grams of solid brownish red product is obtained. The copolymer reaction mole ratio for phenol to formaldehyde to catalyst is 1.0/1.5/0.4.

EXAMPLE XVIII

The procedure of Example I is repeated except that 39.3 grams of 3,5-di (trifluoromethyl) phenol (0.17 mole), 12.5 grams of paraformaldehyde (0.402 mole), 7.5 grams of barium hydroxide octahydrate (0.024 mole), and 20 grams of distilled water are charged. The reaction is run for 31 hours at 100° C. The product, a soft brown solid weighing 38.5 grams, was analyzed by gel permeation chromatography. Molecular size distribution of about 90% of the material ranged from 73 to 18 angstrom units of length.

EXAMPLE XIX 23.0 grams of 3,5-di (trifluoromethyl) phenol (0.1 mole), 8.0 grams of a 50% sodium hydroxide solution (0.2 mole NaOH), and 5.1 grams of paraformaldehyde (0.16 mole) are placed in a 50 ml. glass flask equipped with stirrer, reflux condenser and thermometer. The mole ratio for added materials is 1/1/1.6. The reaction is run for 18 hours at 70° C. After that time, 2 grams of water and 4 drops of 50% sodium hydroxide are added to the reaction flask and heating is continued for 48 hours at 90–100° C., and, finally, for 4 hours at 110–120° C. After cooling, the reaction product is first washed with dilute acetic acid to a pH of 5 and then with water. The resulting material is heated under 30–40 mm. Hg to 150–160° C. until no more volatile material distilled off. The final product is an amber-colored soft resin weighing 18.0 grams.

EXAMPLE XX

A resole copolymer is prepared by the procedure of Example I, using 121.5 grams of meta-trifluoromethylphenol (0.75 mole) and 27.0 grams of metacresol (0.25 mole), together with 40.0 grams of paraformaldehyde (1.72 moles), 21.0 grams of barium hydroxide octahydrate (0.067 mloe), and 80.0 grams of distilled water. The mole ratio of materials is (0.75+0.25)/1.27/0.067. The reaction mixture is run for one hour at 100° C. The reaction product is dissolved in methyl alcohol and filtered through No. 2 Whatman paper, leaving an insignificant residue. After removing the methanol by drying at 45° C. under vacuum, the yield is 190 grams. Five grams of this material cured under a pressure of 1500–5000 p.s.i. for ½ hour at 120° C. and 1 hour at 140° C. An opaque hard yellow pellet was formed which turned brown when postcured for 2 hours at 180° C.

EXAMPLE XXI

A resole copolymer is prepared by the procedure of Example I using 121.5 grams of meta-trifluoromethylphenol (0.75 mole) and 27.0 grams of orthocresol (0.25 mole), together with 49 grams of paraformaldehyde (1.56 moles), 21.0 grams of barium hydroxide octahydrate (0.067 mole), and 100 grams of distilled water. The mole ratio of materials is (0.75+0.25)/1.56/0.067. The reaction is run for 7 hours and 10 minutes. The yield is a brown hard solid of 90.7 grams and soluble in acetone.

EXAMPLE XXII

The procedure of Example XXI is repeated using 23.5 grams of phenol (0.25 mole) in place of orthocresol. The yield is 177 grams of a reddish brown solid which is soluble in acetone.

EXAMPLE XXIII

A resole copolymer is prepared by the procedure of Example I, using 121.5 grams of meta-trifluoromethylphenol (0.75 mole) and 108.0 grams of orthocresol (1 mole), together with 79 grams of paraformaldehyde (2.5 moles), 42 grams of barium hydroxide octahydrate (0.133 mole), and 140 grams of distilled water. The mole ratio is thus adjusted to (0.47+0.53)/1.43/0.076. The reaction is run for 1½ hours. The resole was advanced too far and could be dissolved only after prolonged treatment with a mixture of methanol/acetone and acetic acid. After removal of the acetic acid and solvents, a yield of 141 grams of a brown glossy material is obtained. Five grams of this material was powdered and molded into a transparent reddish brown pellet by curing overnight at 144° C. under 2000–5000 p.s.i.

EXAMPLE XXIV

The procedure of Example I repeated except that 9.8 grams of 3,5-dihydroxybenzotrifluoride (0.055 mole), 2.8 grams of paraformaldehyde (0.088 mole), 3.46 grams of barium hydroxide octahydrate (0.011 mole), and 5 grams of distilled water are charged. The mole ratio is thus adjusted to 1/1.6/0.2. The reaction was run for 6 hours. The product gelled in the glass reaction flask, from which it could not be removed.

EXAMPLE XXV

A resole copolymer is prepared by the procedure of Example I, using 121.5 grams of meta-trifluoromethylphenol (0.75 mole) and 27.0 grams of para-cresol (0.25 mole), together with 98 grams of paraformaldehyde (3.1 moles), 21 grams barium hydroxide octahydrate (0.067 mole), and 80 grams of distilled water. The mole ratio is thus adjusted to (0.75+0.25)/3.1/0.067. The reaction is run for 7 hours, and a yield of 174 grams is produced.

EXAMPLE XXVI

A mixture of 81.2 grams of meta-trifluoromethylphenol (0.5 mole), 250 grams of a 36% formaldehyde solution (3 moles of formaldehyde), 10 grams of sodium hydroxide (0.25 mole), and 420 grams of water is heated under an argon atmosphere to 90° C. for a period of 6 hours while the mixture is being gently stirred. After cooling to room temperature, the mixture is acidified to a pH of 5 with sulfuric acid and extracted with ethyl ether. The ether solution is washed with water and dried with silica gel. The almost-white ether solution is evaporated at 35–38° C. under reduced pressure to yield 96 grams of a clear slightly cream-colored syrup. The syrup was advanced in an air oven by aging at 55° C. for about 2 days, at 63° C. for one day, and finally at 90° C. for 7 hours. A weight loss of 8.5% occurred during aging. The resulting product was syrupy at 90° C. and glossy at room temperature. It was ground in a mortar to a light cream powder with a yield of 74.1 grams.

EXAMPLE XXVII

The properties of the resins disclosed herein as a laminating resin for fiber reinforced composites are demonstrated by the following glass fiber composite structure. A glass fiber of continuous strand roving high tension S glass of the type, for example, available from the Owens-Corning Company as HTS–904 is found to have a weight of 0.01 gram per inch of glass strand. Glass strand 700 inches long is de-sized by being immersed in 500 ml. of methyl ethyl ketone for one hour at room temperature. The wet de-sized glass strand is pulled through the filtrate obtained in Example XXII, above, and is air-dried and then is cut into six-inch lengths. A preform is made by pressing 102 six-inch lengths in a rectangular mold at 60° C. and 20 p.s.i., for a period of 10 minutes. The preformed part is dried under vacuum for two hours at room temperature. Curing of the preform is carried out in a pressure mold for one hour at 220° F. and then for two hours at 320° F., at a pressure of 50 p.s.i. The cured part weighs 14.2 grams and has a computed fiber content of 43.2% by weight. Short beam shear tests conducted at nine sample locations show an average of 9.0 k.s.i. Flexure modulus of the same is $3.7 \times 10^6$ p.s.i., with the extreme flexibility of the sample preventing its breakage.

EXAMPLE XXVIII

The procedure of Example IV is repeated except that the amounts of the additive materials are proportionately increased so that the additive materials remain within the mole ratio for materials as used in Example IV. Six batches of material are prepared containing the following amounts of materials:

| Material: | Amount, grams |
|---|---|
| Meta-trifluoromethylphenol | 114 |
| 36% solution of paraformaldehyde | 93 |
| Barium hydroxide | 15 |
| Distilled water | 15 |

The following table lists reaction times and yields for each batch:

| Batch | Reaction time, hours | Yield, grams | pH of aqueous fraction |
|---|---|---|---|
| A | 10½ | 164 | 8.25 |
| B | 10½ | 161 | 8.20 |
| C | 10 | 164 | 8.28 |
| D | 10 | 143 | 6.79 |
| E | 11 | 162 | 8.15 |
| F | 11 | 170 | 8.27 |

The batches A to F were combined by blending the hot solutions. Analysis of the combined batches gave the following values: carbon, 51.20%; hydrogen, 3.80%; fluorine, 28.81%.

EXAMPLE XXIX

The procedure of Example I is repeated using 162 grams of meta-trifluoromethylphenol, 49 grams of paraformaldehyde, 63 grams of barium hydroxide octahydrate, and 112 grams of distilled water. The mole ratio is thus adjusted to 1.0/1.6/0.2. The barium catalyst is removed from the resole by dissolving it in methyl ethyl ketone and repeated extraction with dilute sulfuric acid. The barium is precipitated as insoluble barium sulfate. The resulting clear methyl ethyl ketone solution is washed free of sulfuric acid with distilled water. The methyl ethyl ketone is removed by vacuum stripping. The resulting product was isolated as a brittle material which readily crumbles to form a coarse powder and which weights 179.7 grams. Analysis of the product gave the following values: carbon, 53.78%; hydrogen, 3.87%; fluorine, 29.79%.

The trifluorophenolmethyl monomer intermediate of the present invention is useful as a laminating adhesive for plywood.

The resole of the present invention is suitable for a number of uses, including:

(1) use as a laminating resin for fiber reinforced composites;

(2) Use as a molding powder, with and without particulate fillers, for molding structures, structural components and small parts by compression and transfer molding;

(3) Use as an adhesive for plywood, paper board, leather, fabrics, and porous materials; and (4) Use as a coating for metals, wood, plastic composites, and other materials whether dense or porous. This resin is particularly suited for any of the above uses where resistance to ultraviolet radiation, moisture, solvents, corrosive liquids and solids and flame are essential and, in particular, where one of the uses is associated with electrical or electronic equipment.

Although this invention has been described in considerable detail with reference to certain preferred embodiments thereof, it should be understood that variations and modifications can be effected within the spirit and scope of the invention as described hereinabove and as defined in the appended claims.

What is claimed is:

1. A resole having the formula:

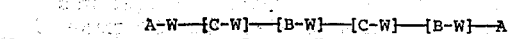
$$A-W-[C-W]_o-[B-W]_p-[C-W]_r-[B-W]_s-A$$

where:

A is          B is

C is either

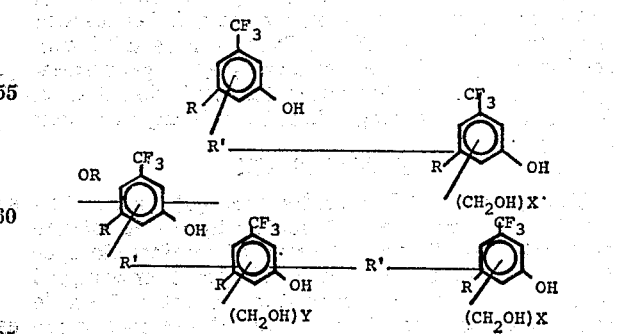

and where:

W is —CH$_2$— or —CH$_2$—O—CH$_2$—;
R is —H, —CF$_3$, or —OH;
R' is —CH$_2$— or —CH$_2$—O—CH$_2$—;
each of $o$, $p$, $r$ and $s$ is an integer from 0 to 6;
each X is 0, 1, or 2;
each Y is 0 or 1; and wherein the compound contains at least one methylol group on a terminal phenyl ring.

2. The compound of claim 1, wherein R is hydroxyl.
3. The compound of claim 1, wherein R is trifluoromethyl.
4. The metatrifluoromethylphenol-formaldehyde condensation resole of claim 1.
5. A resole having the formula:

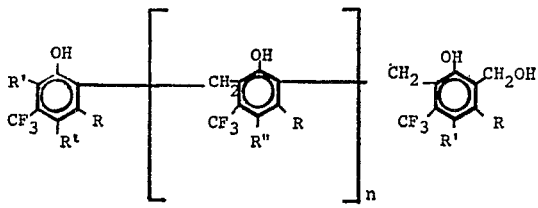

where N is 0 to 6 and R is hydrogen, hydroxyl or trifluoromethyl; R' is hydrogen or hydroxylmethyl; and R" is hydrogen, hydroxylmethyl or:

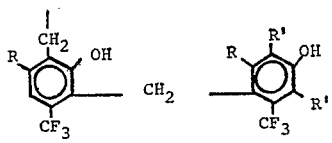

6. Process for preparing a phenol-formaldehyde condensation resole comprising reacting a phenol which contains a trifluoromethyl group in a position meta to the hydroxyl group on the phenyl ring with formaldehyde in the presence of a basic catalyst and at a temperature of 90° C. to 130° C., a pressure of atmospheric to autogenous, and a reactant ratio of about 1.2 to 4.0 moles of formaldehyde per mole of phenol.

7. Process of claim 6 wherein the basic catalyst is selected from the group consisting of tertiary amines, quaternary ammonium hydroxides, alkali metal hydroxides, and alkaline earth metal hydroxides.
8. Process of claim 6 wherein the basic catalyst is barium hydroxide.
9. The process of claim 6 wherein formaldehyde is reacted with a dihydroxytrifluoromethylbenzene.
10. The process of claim 6 wherein formaldehyde is reacted with a ditrifluoromethylphenol.
11. The process of claim 6 wherein the condensation product is cured at a temperature of 250° to 400° F.
12. A composite material comprising a cured condensation resin, prepared by the process of claim 11, having fibrous resole reinforcing materials mixed therein.
13. A composite material comprising a cured metatrifluoromethylphenol-formaldehyde condensation resin having fibrous reinforcing materials mixed therewith.
14. A phenol-formaldehyde condensation resole having a trifluoromethyl group in a position meta to the hydroxyl group on each phenyl ring.

References Cited

UNITED STATES PATENTS 2,994,686   8/1961   Hauptschein _____ 260—53

OTHER REFERENCES

Chemistry of Phenolic Resins, Martin, 1956, pp. 59–63.

HOWARD E. SCHAIN, Primary Examiner

U.S. Cl. X.R.

117—155 L; 161—264; 260—19 UA, 623 D, 838